United States Patent
Zheng et al.

(10) Patent No.: US 11,223,283 B2
(45) Date of Patent: Jan. 11, 2022

(54) UNIVERSAL OUTPUT CURRENT REGULATION FOR A FLYBACK CONVERTER

(71) Applicant: DIALOG SEMICONDUCTOR INC., Campbell, CA (US)

(72) Inventors: Cong Zheng, Campbell, CA (US); Wenduo Liu, Campbell, CA (US); Hien Bui, Campbell, CA (US)

(73) Assignee: Dialog Semiconductor Inc., Campbell, CA (US)

( * ) Notice: Subject to any disclaimer, the term of this patent is extended or adjusted under 35 U.S.C. 154(b) by 60 days.

(21) Appl. No.: 16/853,575

(22) Filed: Apr. 20, 2020

(65) Prior Publication Data

US 2021/0328517 A1    Oct. 21, 2021

(51) Int. Cl.
*H02M 3/335* (2006.01)
*H02M 1/08* (2006.01)

(52) U.S. Cl.
CPC ......... *H02M 3/33515* (2013.01); *H02M 1/08* (2013.01); *H02M 3/33523* (2013.01)

(58) Field of Classification Search
None
See application file for complete search history.

(56) References Cited

U.S. PATENT DOCUMENTS

| | | | |
|---|---|---|---|
| 8,995,150 B2 | 3/2015 | Yan et al. | |
| 9,184,667 B2 | 11/2015 | Shi et al. | |
| 2010/0321956 A1* | 12/2010 | Yeh | H02M 3/33507 363/16 |
| 2014/0009977 A1* | 1/2014 | Huang | H02M 3/33507 363/21.16 |
| 2014/0177290 A1* | 6/2014 | Zhang | H02M 3/33507 363/21.13 |
| 2015/0168476 A1* | 6/2015 | Park | G01R 31/52 324/549 |

* cited by examiner

*Primary Examiner* — Jeffrey A Gblende
(74) *Attorney, Agent, or Firm* — Haynes and Boone, LLP

(57) ABSTRACT

Disclosed is a universal primary-only output current regulation for a flyback converter. A controller determines a peak sense resistor voltage responsive to a desired average output current for the flyback converter during a continuous conduction mode of operation. After a power switch transistor is cycled on, the controller monitors a sense resistor voltage to determine when the sense resistor voltage equals the peak sense resistor voltage. The controller switches off the power switch transistor when the sense resistor voltage equals the peak sense resistor voltage to maintain an average output current for the flyback converter equal to the desired average output current.

20 Claims, 4 Drawing Sheets

UNIVERSAL OUTPUT CURRENT REGULATION FOR A FLYBACK CONVERTER

TECHNICAL FIELD

This application relates generally to a flyback converter, and more particularly to a flyback converter with primary-only output current regulation.

BACKGROUND

Flyback converters have a number of modes in which the output current must be regulated as opposed to regulating the output voltage. For example, there is an output current limit that cannot be exceeded during the charging of a mobile device's battery. Should the output current reach the output current limit during charging, the flyback converter must switch from a constant output voltage regulation to a constant output current regulation mode to avoid exceeding the output current limit. In addition, a flyback converter for powering a light-emitting diode (LED) typically operates in a constant current mode of regulation.

To operate in a constant current mode, the flyback converter may include a sense resistor on the secondary side of the transformer to measure the output current. A secondary-side controller may then transmit the output current value through a ground-isolating communication channel such as an optocoupler to a primary-side controller that then regulates the switching of a primary-side power switch accordingly. But the sense resistor introduces loss and thus lowered efficiency. In addition, the need for an optoisolator raises manufacturing cost and complexity.

To avoid the need for a secondary-side sense resistor, primary-only output current sensing flyback converters have been developed. But the primary-output current sensing in such devices is only valid during a discontinuous conduction mode (DCM). In DCM operation, the output load is such that the after the power switch is cycled off, the secondary winding current (the output current) then ramps down from a peak current to a zero current. The delay from the primary switch off-time to when the secondary winding current ramps down to zero in DCM operation is denoted as the transformer reset time. Conventional primary-only current sensing uses the transformer reset time to estimate the output current. But such an estimation of the output current is only valid during DCM operation. During times of high load, a flyback converter may transition from DCM operation to a continuous current mode (CCM). In CCM operation, the secondary winding current has not ramped to zero when the power switch is again cycled on. There is thus a need in the art for improved primary-only current sensing techniques and systems to function in a continuous conduction mode.

SUMMARY

In accordance with a first aspect of the disclosure, a controller for a flyback converter is provided that includes: a logic circuit configured to calculate a peak sense resistor voltage for a current switching cycle of a power switch transistor responsive to a desired average output current for the flyback converter during a continuous conduction mode of operation; a comparator configured to compare the peak sense resistor voltage to a sense resistor voltage; and a switch driver configured to cycle off the power switch transistor in the current switching cycle responsive to an output signal from the comparator indicating that the sense resistor voltage equals the peak sense resistor voltage.

In accordance with a second aspect of the disclosure, a method of operation for a flyback converter during a continuous conduction mode is provided that includes: measuring an on-time for a power switch transistor in a previous switching cycle of the power switch transistor to provide a measured on-time; switching on the power switch transistor in a current switching cycle of the power switch transistor; calculating a peak sense resistor voltage responsive to a desired average output current, the measured on-time, an input voltage to the flyback converter, a turns ratio for a transformer in the flyback converter, and a period for the current switching cycle; and switching off the power switch transistor in the current switching cycle responsive to a sense resistor voltage equaling the peak sense resistor voltage to maintain an average output current for the flyback converter equal to the desired average output current.

In accordance with a third aspect of the disclosure, a flyback converter is provided that includes: a transformer including a primary winding; a power switch transistor connected to the primary winding; a sense resistor in series with the power switch transistor; and a controller configured to control a cycling of the power switch transistor so that a sense resistor voltage across the sense resistor in a current cycle of the power switch transistor equals a peak sense resistor voltage that is a function of a desired average output current for the flyback converter, a period for the current cycle of the power switch transistor, an input voltage to the flyback converter, a measured on-time for the power switch transistor in a previous cycle of the power switch transistor, a magnetizing inductance of the transformer, and a turns ratio of the transformer to control an average output current for the flyback converter to equal the desired average output current.

Other devices, apparatuses, systems, methods, features, and advantages of the invention will be or will become apparent to one with skill in the art upon examination of the following figures and detailed description. It is intended that all such additional devices, apparatuses, systems, methods, features, and advantages be included within this description, be within the scope of the invention, and be protected by the accompanying claims.

BRIEF DESCRIPTION OF THE FIGURES

The invention may be better understood by referring to the following figures. The components in the figures are not necessarily to scale, emphasis instead being placed upon illustrating the principles of the invention. In the figures, like reference numerals designate corresponding parts throughout the different views.

The figures depict various embodiments for purposes of illustration only. One skilled in the art will readily recognize from the following discussion that alternative embodiments of the structures and methods illustrated herein may be employed without departing from the principles of the invention described herein.

DETAILED DESCRIPTION

A universal primary-only output current sensing is disclosed for a flyback converter that is valid in both CCM and DCM operation. This primary-only output current sensing is deemed as "universal" since it is independent of the AC mains standard. For example, the AC mains voltage may be 120 VAC or 240 VAC but the primary-only output current disclosed herein is unaffected. Since the output current sensing is primary-only, the efficiency is improved as compared to the direct sensing of the output current with a secondary-side sense resistor. In addition, there is no need for an optocoupler or other type of ground-isolating communication channel to transmit the sensed output current value from the secondary-side to the primary-side of the flyback converter so that manufacturing complexity and cost is reduced.

The primary-only output current sensing disclosed herein senses the average output current. After the off-time in a cycle of the power switch transistor, the output current surges high and ramps down before the next on-time in a subsequent cycle of the power switch transistor. The output current does not flow during the on-times of the power switch transistor. So the average output current accounts for the pulsing of the output current and the zero-current period in each cycle of the power switch transistor.

Figure 1:
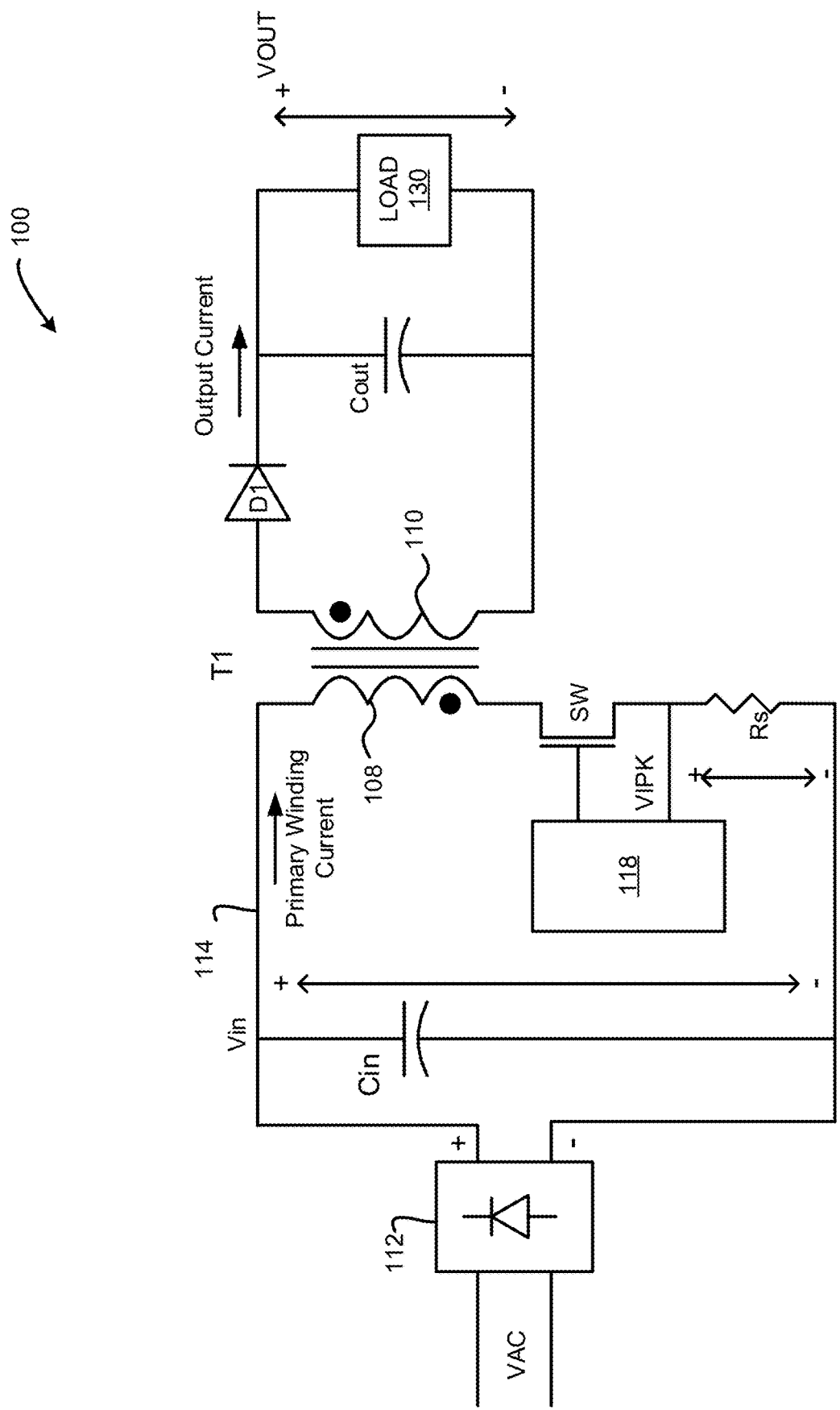
FIG. 1 illustrates an example flyback converter with primary-only output current regulation in accordance with an aspect of the disclosure.

An example primary-only output current sensing flyback converter 100 is shown in FIG. 1. A rectifier such as a diode bridge 112 rectifies an AC mains voltage VAC to provide a rectified input voltage Vin on an input rail 114 for flyback converter 100. An input capacitor Cin couples between input rail 114 and ground to filter and store the input voltage Vin. Input rail 114 connects to primary winding 108 of a transformer T1 having a secondary winding 110. Primary winding 108 also connects to a power switch transistor SW that in turn couples to ground through a sense resistor Rs. A controller 118 controls the cycling of power switch transistor SW to regulate an output voltage Vout in a constant-voltage mode and to regulate an output current in a constant-current mode. When controller 118 cycles on the power switch transistor SW, a primary winding current flows through primary winding 108 and power switch transistor SW to charge a sense resistor voltage across the sense resistor. Regardless of mode, controller 118 cycles off the power switch transistor SW when the primary winding current reaches a desired peak. This desired peak current drives the sense resistor voltage to equal a desired peak current voltage VIPK. Thus, controller 118 uses the sense resistor voltage as a proxy for the primary winding current and switches off the power switch transistor SW in each cycle responsive to the sense resistor voltage rising to equal the desired peak current voltage VIPK.

Figure 2:
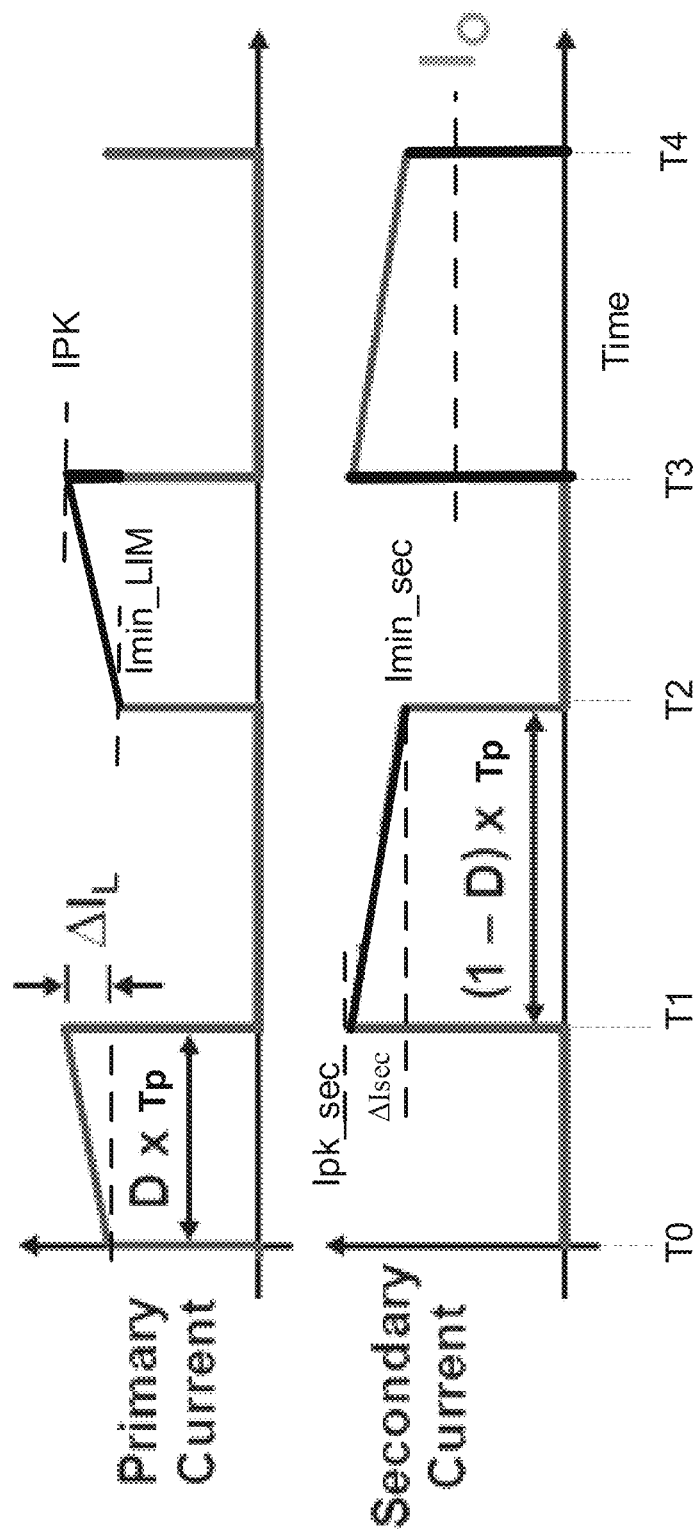
FIG. 2 illustrates the primary and secondary current waveforms for the flyback converter of FIG. 1 for two consecutive cycles of the power switch transistor SW.

While the primary winding current conducts in response to the power switch transistor SW being cycled on, the output current is prevented from conducting such as through an output diode D1. In other embodiments, output diode D1 is replaced by a synchronous rectifier transistor. An output capacitor Cout filters and stores the output voltage for a load 130. During periods in which load 130 is relatively high, controller 118 may need to cycle power switch transistor SW in a continuous conduction mode. Some example primary winding current (primary current) and output current (secondary current) waveforms for flyback converter 100 are shown in FIG. 2. A first switching cycle begins at a time T0. Due to the CCM operation, the primary current does not start from zero but instead starts at a value Imin_LIM. The power switch transistor SW stays on for an on-time equal to D*Tp, where Tp is the period for the cycling of the power switch transistor SW and D is the duty cycle for the on-time (the ratio of the on-time to the switching period Tp). The primary current continues to increase during the on-time until it reaches a peak value IPK at a time T1, whereupon the power switch transistor SW is cycled off. The secondary current pulses to a peak value Ipk_sec at time T1 and then declines to a minimum value Imin_sec at a time T2 when the power switch transistor SW is again cycled on. The time (T2−T1) during which the secondary current flows equals (1−D)*Tp. The switching period from T0 to T2 thus equals D*Tp+(1−D)*Tp, which of course equals Tp. Another switching cycle begins at time T2 with the cycling on of the power switch transistor SW. At a time T3, the power switch transistor SW is cycled off. The secondary current again pulses to its peak value Ipk_sec at time T3 and decreases to its minimum value Imin_sec at a time T4 to end the second cycle.

During a constant current mode, controller 118 controls the cycling of the power switch transistor SW so that an average secondary current Io equals the desired value. But controller 118 cannot directly sense the output current due to the isolation through transformer T1. But controller 118 can directly control the peak value IPK for the primary winding current. This control can be used to regulate the average output current Io as follows. It can then be shown that the average output current Io equals (1−D)*(Ipk_sec−ΔIsec/2), where ΔIsec is the amount by which the secondary current declines from its peak value Ipk_sec to Imin_sec. Due to a turns ratio Nps in transformer T1, the peak primary winding current forces the peak secondary current Ipk_sec to equal Nps*IPK. The average output current Io thus becomes (1−D)*(Nps*IPK−ΔIsec/2). The secondary current change ΔIsec is related to the primary current change ΔIL by the turns ratio Nps. The primary current change ΔIL equals (Vin*Ton)/Lm, where Vin is the input voltage to flyback converter 100, Ton is the on-time for the power switch transistor SW in its previous switching cycle, and Lm is the magnetizing inductance for transformer T1. The average output current Io thus becomes equal to (1−D)*Nps*(IPK−½*(Vin*Ton)/Lm). It thus follows that if the peak primary current IPK is set according to the following equation:

$$IPK=(Io/((1-D)*Nps))+½*Vin*Ton/Lm \quad \text{Eq (1)}$$

then the desired average output current Io is achieved. This relationship is also true in discontinuous conduction mode as well. Note that (1−D) is equal to (Tp−Ton)/Tp, which is equal to Toff/Ts, where Toff is the off-time for the power switch transistor SW in its previous switching cycle. Thus, equation (1) can be restated as:

$$IPK=(Io*Tp)/(Nps*Toff))+½*Vin*Ton/Lm \quad \text{Eq (2)}$$

In discontinuous conduction mode, the off-time for the previous switching cycle is replaced by the transformer reset time for the previous switching cycle. The peak sense resistor voltage VIPK equals Rs*IPK through Ohm's law. The peak sense resistor voltage VIPK corresponding to the peak primary current IPK may thus be expressed as:

$$VIPK=(Io*Tp*Rs)/(Nps*Toff))+½*Vin*Ton*Rs/Lm \quad \text{Eq (3)}$$

where Rs is the sense resistor resistance.

The parameters Lm and Nps are known at manufacture of flyback converter 118 and can be programmed into controller 118 such as through the burning of fuses in a one-time-programmable memory. Controller 118 can directly measure the input voltage Vin. Alternatively, controller 118 can indirectly measure or monitor the input voltage as known in the flyback arts. The switching period is also known. Controller 118 can also measure the on-time Ton for the previous cycle of the power switch transistor SW and use that on-time for the calculation of the peak primary current VIPK in the current cycle of the power switch transistor SW. Thus, once controller 118 senses that the sense resistor voltage equals the VIPK corresponding to the newly-calculated IPK and cycles off the power switch transistor SW accordingly, the output current is regulated to equal the desired average current value Io.

Figure 3:
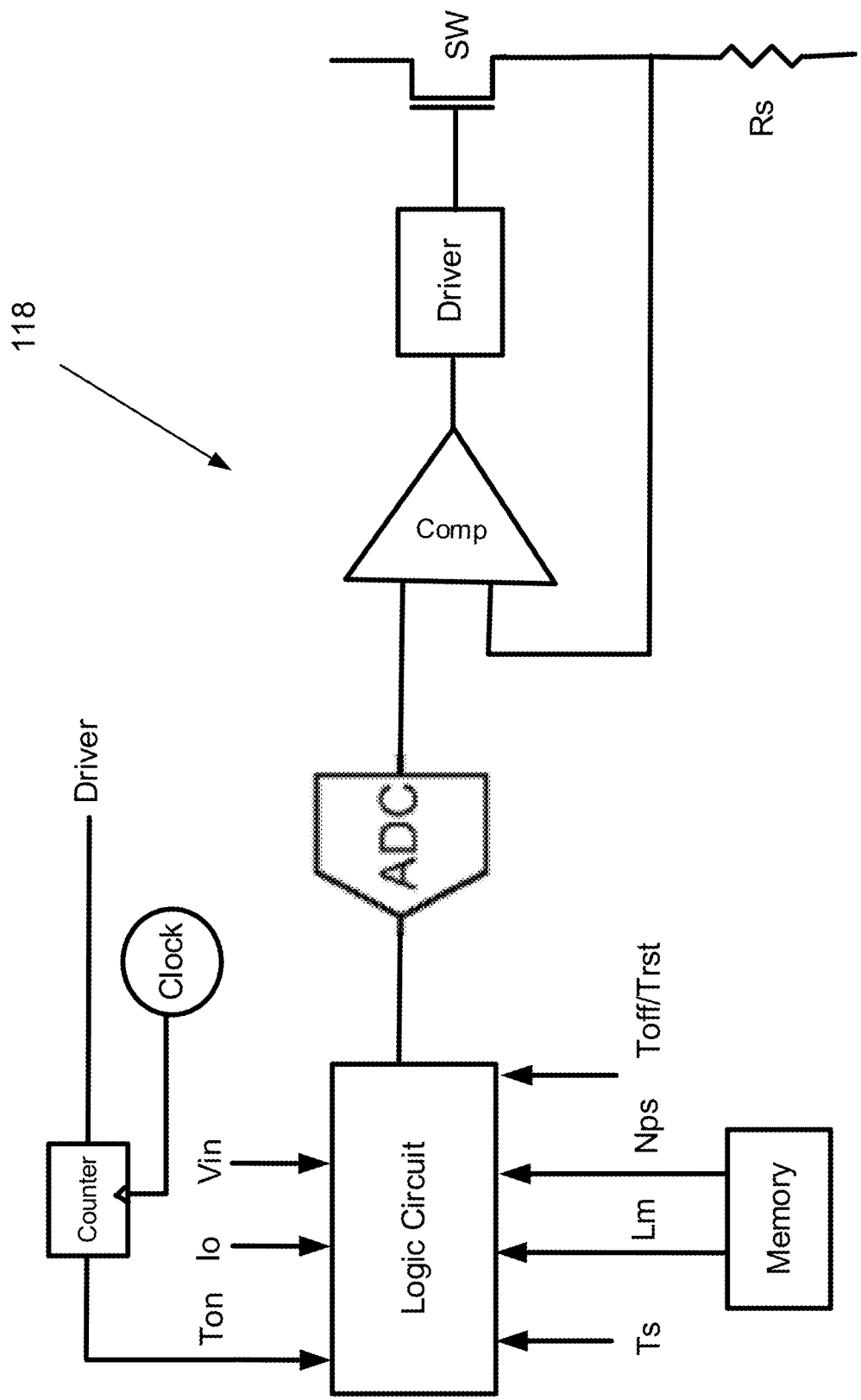
FIG. 3 illustrates a controller for primary-only output current regulation in accordance with an aspect of the disclosure.

An example implementation for controller 118 is shown in more detail in FIG. 3. Controller 118 includes a logic circuit 300 such as a microcontroller for the multiplication of the parameters in equation (3) discussed earlier to calculate a digital value for VIPK (note that VIPK is equal to IPK*(the resistance of the sense resistor Rs)). Logic circuit 300 thus uses a measured on-time Ton, the desired average output current Io, the input voltage Vin, the switching period Ts, the magnetizing inductance Lm, the measured off-time, and the turns ratio Nps. For example, logic circuit 300 may use a first function of the desired average output current Io, the switching period Tp, the measured off-time, the turns ratio Nps, and the sense resistance Rs to form a first value (the first half of equation (3)). Note that the measured off-time is replaced by the transformer reset time Trst during discontinuous conduction mode. The transformer reset time Trst is the delay from the off-time of the power switch transistor SW to when the secondary current ramps to zero during discontinuous conduction mode.

Logic circuit 300 may use a second function of the input voltage Vin, the measured on-time Ton, the magnetizing inductance Lm, and the sense resistance to form a second value (the second half of equation (3)). By adding the first value and the second value, logic circuit 300 forms a digital version of the peak sense resistor voltage. An analog-to-digital converter (ADC) converts the digital value for VIPK into an analog version that is compared in a comparator to the sense resistor voltage. When an output signal for the comparator indicates that the sense resistor voltage has risen to equal VIPK, a switch driver switches off the power switch transistor SW. Parameters such as the magnetizing inductance Lm and the turns ratio Nps for transformer T1 may be retrieved from a memory (e.g., a fuse-programmable memory). A counter as clocked by a clock signal from a clock may calculate the on-time Ton for the previous switching cycle as determined from the switch driver output signal. Rather than calculate equation (1) digitally, it will be appreciated that the multiplication and summation to calculate VIPK may be performed in the analog domain such as through the use of operational amplifiers.

Figure 4:
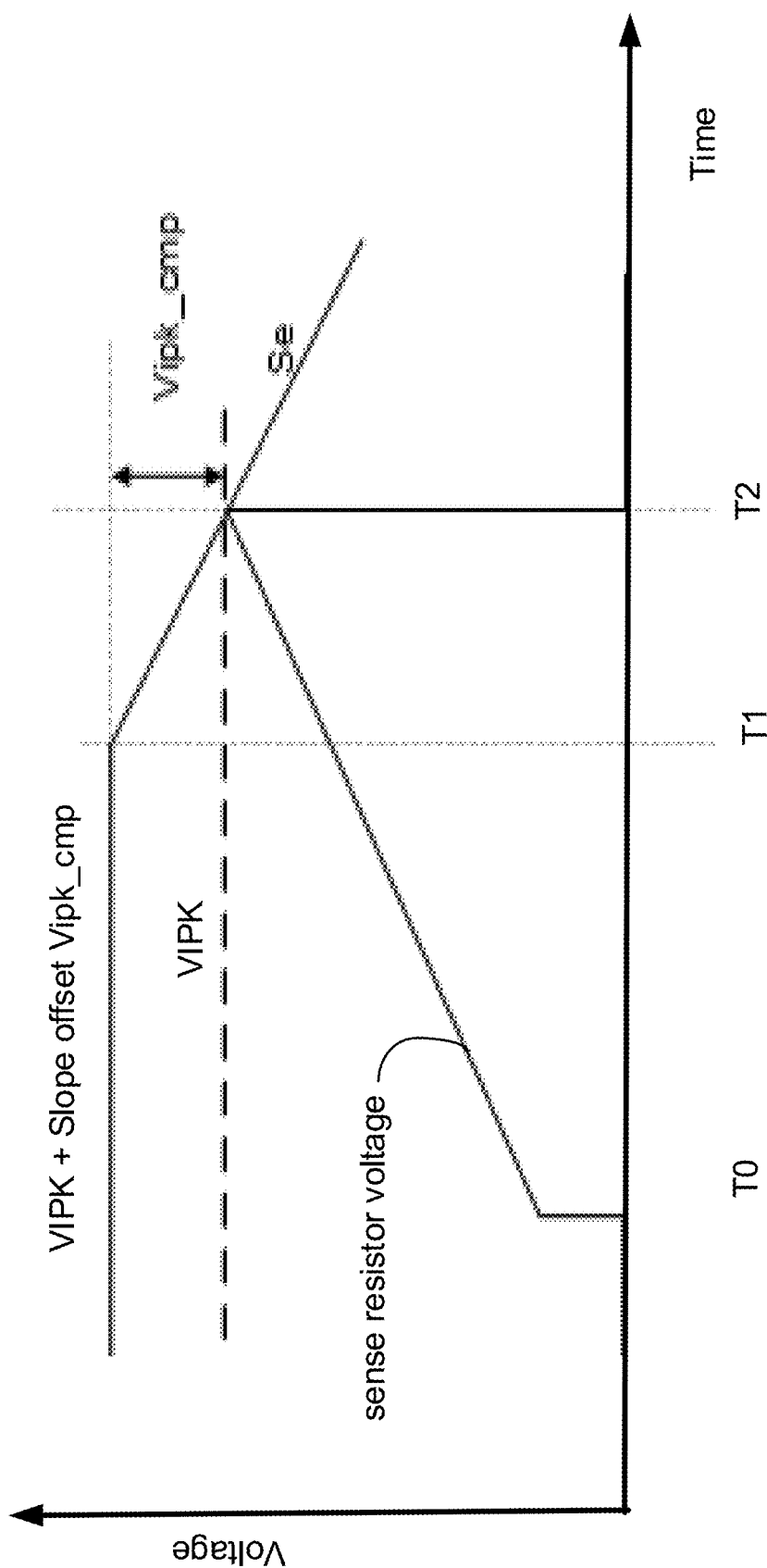
FIG. 4 illustrates a pulse of the sense resistor voltage during a period of slope compensation in which the peak sense resistor voltage is increased to account for the slope compensation and still provide primary-only output current regulation in accordance with an aspect of the disclosure.

Note that the on-time for the power switch transistor SW may be long enough such that slope compensation is applied. The resulting reduction in VIPK would then cause the average output current to deviate from the desired average output current Io. For example, a pulse of the sense resistor voltage during the on-time of power switch transistor SW is shown in FIG. 4. The pulse begins at a time T0 and extends to a time T2. But the delay from the starting time T0 to a time T1 exceeds a slope compensation on-time threshold such that slope compensation begins. Slope compensation thus begins at time T1 to the end of the on-time at time T2 such that the commanded-for VIPK is reduced according to a slope compensation slope Se. But controller 118 is configured to sense the application of slope compensation in the previous switching cycle and detect the slope compensation amount or offset Vipk_cmp that was applied during the slope compensation period. Controller 118 thus increases the commanded-for VIPK in the current switching cycle by this offset Vipk_cmp so that when the on-time period ends at time T2, the desired VIPK is achieved. In other words, controller 118 would have commanded for VIPK according to equation (3) in the absence of slope compensation. But when slope compensation is detected, controller 118 then commands for VIPK+Vipk_cmp so that when the slope compensation reduces this commanded-for amount by Vipk_cmp, the desired value of VIPK is achieved.

It will be understood that various aspects or details of the disclosure may be changed without departing from the scope of the disclosure. It is not exhaustive and does not limit the claimed disclosures to the precise form disclosed. Furthermore, the foregoing description is for the purpose of illustration only, and not for the purpose of limitation. Modifications and variations are possible in light of the above description or may be acquired from practicing the disclosure. The claims and their equivalents define the scope of the disclosure. Moreover, although the techniques have been described in language specific to structural features and/or methodological acts, it is to be understood that the appended claims are not necessarily limited to the features or acts described. Rather, the features and acts are described as example implementations of such techniques.

To the extent that terms "includes," "including," "has," "contains," and variants thereof are used herein, such terms are intended to be inclusive in a manner similar to the term "comprises" as an open transition word without precluding any additional or other elements. Moreover, conditional language such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc. may be either X, Y, or Z, or a combination thereof.

In some alternative examples of implementations, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram. Moreover, the operations of the example processes are illustrated in individual blocks and summarized with reference to those blocks. The processes are illustrated as logical flows of blocks, each block of which can represent one or more operations that can be implemented in hardware, software, or a combination thereof. In the context of software, the operations represent computer-executable instructions stored on one or more computer-readable medium that, when executed by one or more processing units, enable the one or more processing units to perform the recited operations. Generally, computer-executable instructions include routines, programs, objects, modules, components, data structures, and the like that perform particular functions or implement particular abstract data types. The order in which the operations are described is not intended to be construed as a limitation, and any number of the described operations can be executed in any order, combined in any order, subdivided into multiple sub-operations, and/or executed in parallel to implement the described processes. The described processes can be performed by resources associated with one or more device(s) such as one or more internal or external CPUs or GPUs, and/or one or more pieces of hardware logic such as FPGAs, DSPs, or other types of accelerators.

What is claimed is:

1. A flyback controller for a flyback converter, comprising;
   a logic circuit configured to calculate a peak sense resistor voltage for a current switching cycle of a power switch transistor responsive to a desired average output current for the flyback converter during a continuous conduction mode of operation;
   a comparator configured to compare the peak sense resistor voltage to a sense resistor voltage; and
   a switch driver configured to cycle off the power switch transistor in the current switching cycle responsive to an output signal from the comparator indicating that the sense resistor voltage equals the peak sense resistor voltage to maintain an average output current for the flyback converter equal to the desired average output current.

2. The flyback controller of claim 1, wherein the logic circuit is a microcontroller.

3. The flyback controller of claim 1, wherein the logic circuit is further configured to calculate the peak sense resistor voltage responsive to a turns ratio for a transformer in the flyback converter.

4. The flyback controller of claim 1, wherein the logic circuit is further configured to calculate the peak sense resistor voltage responsive to an input voltage to the flyback converter.

5. The flyback controller of claim 1, wherein the logic circuit is further configured to calculate the peak sense resistor voltage responsive to an on-time for the power switch transistor in a previous switching cycle.

6. The flyback controller of claim 5, wherein the logic circuit is further configured to increase the peak sense resistor voltage by a slope compensation offset.

7. The flyback controller of claim 1, further comprising:
   an analog-to-digital converter configured to convert a digital peak sense resistor voltage from the logic circuit to provide an analog peak sense resistor voltage, and wherein the peak sense resistor voltage to the comparator is the analog peak sense resistor voltage.

8. The flyback controller of claim 1, wherein the logic circuit is further configured to calculate the peak sense resistor voltage responsive to a period for the current switching cycle of the power switch transistor.

9. The flyback controller of claim 3, further comprising:
   a memory for storing the turns ratio and also a magnetizing inductance of the transformer, wherein the logic circuit is further configured to calculate the peak sense resistor voltage responsive to the magnetizing inductance of the transformer.

10. A method of operation for a flyback converter during a continuous conduction mode, comprising:
    measuring an on-time for a power switch transistor in a previous switching cycle of the power switch transistor to provide a measured on-time;
    switching on the power switch transistor in a current switching cycle of the power switch transistor;
    calculating a peak sense resistor voltage responsive to a desired average output current, the measured on-time, an input voltage to the flyback converter, a turns ratio of a transformer in the flyback converter, a magnetizing inductance of the transformer, and a period of the current switching cycle; and
    switching off the power switch transistor in the current switching cycle responsive to a sense resistor voltage equaling the peak sense resistor voltage to maintain an average output current for the flyback converter equal to the desired average output current.

11. The method of claim 10, wherein calculating the peak sense resistor voltage comprises:
    forming a first function of the desired average output current, the period, a difference of the period and the measured on-time, the turns ratio, and a sense resistor resistance to provide a first value;
    forming a second function of the input voltage, the measured on-time, the magnetizing inductance, and the sense resistor resistance to provide a second value; and
    adding the first value and the second value to calculate the peak sense resistor voltage.

12. The method of claim 11, wherein the first function is a ratio of a first product of the desired average output current, the sense resistor resistance, and the period divided by a second product of the turns ratio and the difference of the period and the measured on-time.

13. The method of claim 11, wherein the second function is a ratio of a first product of the input voltage, the measured on-time, and the sense resistor resistance divided by twice the magnetizing inductance.

14. The method of claim 10, further comprising using the method during a discontinuous conduction mode.

15. A flyback converter, comprising:
    a transformer including a primary winding;
    a power switch transistor connected to the primary winding;
    a sense resistor in series with the power switch transistor; and
    a controller configured to control a cycling of the power switch transistor so that a sense resistor voltage across the sense resistor in a current cycle of the power switch transistor equals a peak sense resistor voltage that is a function of a desired average output current for the flyback converter, a period for the current cycle of the power switch transistor, an input voltage to the flyback converter, a measured on-time for the power switch transistor in a previous cycle of the power switch transistor, a magnetizing inductance of the transformer, and a turns ratio of the transformer to control an average output current for the flyback converter to equal the desired average output current.

16. The flyback converter of claim 15, wherein the controller comprises a logic circuit.

17. The flyback converter of claim 16, wherein the logic circuit is a microcontroller.

18. The flyback converter of claim 15, wherein the controller further comprises:
a counter configured to count during the previous cycle of the power switch transistor to provide the measured on-time.

19. The flyback converter of claim 18, wherein the controller further comprises:
a comparator configured to compare the sense resistor voltage to the peak sense resistor voltage, wherein the controller is further configured to cycle off the power switch transistor in the current cycle of the power switch transistor responsive to an output signal from the comparator indicating that the sense resistor voltage equals the peak sense resistor voltage.

20. The flyback converter of claim 19, further comprising a switch driver for cycling the power switch transistor.

* * * * *